United States Patent

Becherer et al.

[11] Patent Number: 5,895,854
[45] Date of Patent: Apr. 20, 1999

[54] VEHICLE WHEEL PROVIDED WITH A PNEUMATIC TIRE HAVING THEREIN A RUBBER MIXTURE PERMEATED WITH MAGNETIZABLE PARTICLES

[75] Inventors: Thomas Becherer, Hannover; Martin Fehrle, Garbsen, both of Germany

[73] Assignee: Continental Aktiengesellschaft, Hannover, Germany

[21] Appl. No.: 08/744,876

[22] Filed: Nov. 8, 1996

[30] Foreign Application Priority Data

Nov. 8, 1996 [DE] Germany ............... 196 46 251

[51] Int. Cl.[6] ............ B29D 30/00; B29D 30/72; B60C 1/00; B60C 13/00
[52] U.S. Cl. ............ 73/514.39; 73/146; 152/450; 152/525; 156/110.1; 156/123; 156/272.4; 264/108; 264/429; 264/437; 324/174; 364/565; 701/70
[58] Field of Search ............ 152/450, 525; 264/429, 437, 108; 156/110.1, 272.4, 123; 324/173, 174; 303/DIG. 7, 166, 191; 188/1.11 E, 1.11 R; 364/565; 340/441; 73/146, 514, 39; 701/70

[56] References Cited

U.S. PATENT DOCUMENTS

| | | | |
|---|---|---|---|
| 3,225,810 | 12/1965 | Enabnit | 152/450 X |
| 3,233,647 | 2/1966 | Newell | 264/429 X |
| 3,469,662 | 9/1969 | Dewar | 324/174 X |
| 3,705,284 | 12/1972 | Binard | 156/110.1 X |
| 3,708,750 | 1/1973 | Bucks et al. | 324/174 X |
| 3,750,120 | 7/1973 | McCarty | 152/525 X |
| 4,570,152 | 2/1986 | Melton et al. | |
| 4,698,536 | 10/1987 | Oohori | 324/173 X |
| 5,026,178 | 6/1991 | Ballhaus | |
| 5,131,763 | 7/1992 | Caron | |
| 5,261,752 | 11/1993 | Ouchi et al. | |

FOREIGN PATENT DOCUMENTS

| | | |
|---|---|---|
| 0049893 | 4/1982 | European Pat. Off. |
| 0101225 | 2/1984 | European Pat. Off. |
| 0375019 | 6/1990 | European Pat. Off. |
| 0378939 | 7/1990 | European Pat. Off. |
| 2574501 | 6/1986 | France |
| 4435160 | 4/1996 | Germany |
| 19503468 | 5/1996 | Germany |
| 19503469 | 5/1996 | Germany |

Primary Examiner—Adrienne Johnstone
Attorney, Agent, or Firm—Robert W. Becker & Associates

[57] ABSTRACT

A vehicle wheel is provided with a pneumatic tire and has a way to provide information. The pneumatic tire has at least at one predetermined location a rubber mixture that is permeated with magnetizable particles. An annular band of this rubber mixture contains the magnetizable particles anisotropically aligned in a peripheral direction of the tire. The tire can be used in a slip regulation system.

12 Claims, 2 Drawing Sheets

VEHICLE WHEEL PROVIDED WITH A PNEUMATIC TIRE HAVING THEREIN A RUBBER MIXTURE PERMEATED WITH MAGNETIZABLE PARTICLES

BACKGROUND OF THE INVENTION

The present invention relates to a vehicle wheel that is provided with a pneumatic tire and that has means for providing information. Furthermore, the present invention relates to a method and apparatus for producing a tire for such a vehicle wheel.

The patents DE-195 03 468 and -9 disclose wheel bearing seal arrangements that have magnetizable elastomeric material and, to detect the rotation, are provided with a multi-pole ring that is disposed across from a sensor secured to the chassis.

EP 0 378 939 similarly describes a rotating seal having a magnetic coding as an indicator.

Aside from general shortcomings, such means for indicating the number of turns have the general drawback that they are not suitable for determining the information that is of interest for regulating slipping or sliding using the longitudinal forces that act upon the vehicle wheel.

In addition, the subject matter of the aforementioned documents are in principle not suitable for contributing any suggestion to the present invention.

The application PCT/EP95/03864 discloses a measuring system for detecting the longitudinal force of the tire and/or the tire deformation that is caused by the wheel load. The present invention is intended to serve in particular for the further development of this promising system.

SUMMARY OF THE INVENTION

It is an object of the present invention to provide a vehicle wheel that is provided with a pneumatic (rubber) tire, with the aid of which the information required for operating a modern vehicle, e.g. wheel rotational speed for ABS (Antilock Brake system) and/or longitudinal forces (torsional forces) that act upon the tire for regulating slipping, can be made available. In particular, a high level of security against vandalism and sabotage is to be achieved.

This object is realized in that the tire of the vehicle wheel, at least at one predetermined location, contains a rubber mixture that is permeated with magnetizable particles. These magnetizable locations, e.g. an annular band in the sidewall of the tire, should in the longitudinal or peripheral direction have successive zones of different magnetization (e.g. bar codes) in one or more rows disposed at different radii along the peripheral direction of the tire. Thus with the aid of a sensor that is secured to the chassis, not only can the rotational speed of the respective wheel be provided, but rather while additionally avoiding a reading row of the bar code that is disposed further radially inwardly, in place thereof or in addition thereto time intervals between the passive outer and inner marks can be measured, the lengths of which correlate with the desired information for longitudinal force and/or tire deflection.

In the magnetized zones, the magnetic lines of flux preferably extend in the peripheral direction. In this connection, a signal spacing is achieved by different orientation or alignment of the lines of flux (polarity).

A further object of the present invention is to provide a method and a related apparatus for producing an inventive tire.

The method essentially comprises introducing ferromagnetic particles into the rubber mixture, preferably in the vicinity of the sidewall of the tire, and magnetizing such ferromagnetic particles in the peripheral direction of the tire with alternating polarity. The magnetization is preferably achieved by means of magnetic lines of flux that extend in the peripheral direction. The rubber mixture is for example in the form of an annular band obtained by either a straight extrusion or a straight calenderation aligning the magnetizable particles in the direction of extrusion or calenderation and by forming the straight band into the annular band.

The polarization, which varies over the periphery, preferably alternating, is preferably effected after installation of the band that contains the magnetizable particles into the green tire, and in addition preferably after vulcanization thereof. Mose preferably, the polarization is effected after the tire is delivered to a customer, and most preferably only shortly prior to mounting of the tire on a wheel, so that the signal sequence stored in the tire in at least one row on at least one sidewall of the tire can be set precisely to the requirements of a vehicle that is to be equipped with the tire.

The inventive method can be carried out with an apparatus that comprises field coils that are disposed in the peripheral direction of the tire and are embodied in the form of two half coils; the field or magnetizing coils can be disposed in the inner and outer sides of the tire at the location of the magnetizable regions, and can have supplied thereto electrical current. For this purpose, the two half coils are movably interconnected by electrical lines. So that a closed circuit is formed, an electrical connection exists between in each case two coils in which oppositely connected magnetic fields are built up, while axially extending magnetic lines of flux can be simply generated by conventional magnets, allowing the aforementioned apparatus to generate lines of flux that extend in the peripheral direction of the tire. The polarized zones produced in the tire then similarly have lines of flux that extend in the peripheral direction, as a result of which the signals can be detected particularly reliably and easily by sensors that are preferably arranged in such a way that they follow the spring movements of the wheel suspension and pivoting movements due steering.

If the physical arrangement is such that the lines that run back and forth between the two coils are physically closely adjacent between the two coils, especially preferably snaked together, the magnetic fields that are generated by the current in these connecting lines are nearly eliminated.

The apparatus can comprise a plurality of coil pairs. Complicated wiring between the coils is then also possible, but always reverts to the same principle.

The shape of the coils can be adapted to the tire contour. One of the coil halves can be rigidly mounted.

Preferably after the vulcanization of the tire, the proposed apparatus serves for the inhomogeneous, in the peripheral direction of the tire, magnetization of hard magnetic particles that are previously introduced into a region of the tire sidewall. Hard magnetic particles are preferred over soft magnetic particles because the polarity thereof can be changed only with difficulty and therefore makes vandalism and sabotage more difficult. This involves the problem that in order to receive the desired magnetization, very strong magnetic fields are required; even these strong fields are made available by the aforementioned apparatus.

Such an alignment of the magnetization in the peripheral direction minimizes the diminishing of the magnetic polarization in the particles due to the field of the adjacent particles. A demagnetization would be particularly great for laminar magnets that are magnetized perpendicular to the surface, in other words with axial lines of flux.

If the connecting line between the coil pairs is flexible, the distance between the coils can be varied. This is of particular interest for the establishment of a bar code.

The apparatus is preferably embodied in such a way that it is possible to produce therewith a magnetic field that periodically varies in the peripheral direction so that regions with oppositely directed magnetization alternate with one another. The thus generated magnetization and the spatial magnetization differences can be detected with magnetic field sensors and can serve as input signals for slip regulating systems, especially also for SWT systems (sidewall torsion measuring systems).

The hard magnetic particles that are to be introduced into the tire preferably comprised hard ferrites and neodymium iron borides. In the magnetized state they have a maximum coercive field strength of about 10,000 A/cm. Such particles are preferably homogeneously distributed in the peripheral direction. In order to align the magnetic moments in these materials, magnetic fields of the order of magnitude of several Teslas are required. For this purpose, a winding turn density of 100/cm is required for a coil at, for example, a current intensity of 100 A. To achieve as great a field strength as possible in the outer space it is additionally necessary that the moments be aligned in the peripheral direction. In this case after all demagnetization effects ("magnetic short circuits") are particularly small. Demagnetization here means the self attenuation of a magnet due to its own magnetic field, which is particularly directed opposite to the "moments". The effect is a function of geometry and, for example for plates where the magnetization is perpendicular to the plane, is particularly great.

Soft magnetic materials, which in principle can have similar magnitude residual fields as do hard magnetic materials but have considerably smaller coercive field strengths, are less suitable for a tire that is to be used pursuant to the present invention. Although soft magnetic materials are easier to magnetize, they also lose their magnetization easier, for example in external magnetic fields or due to impacts. On addition, already with slight criminal energy they enable the manipulation of the magnetic code. In order to be able to detect a change of the time span between the passes of the two marks (in one row for ABS or in two rows for SWT) as precisely as possible, it is desired that the magnetization in the peripheral direction be effected as quadrilaterally as possible, i.e. that the magnetization should be substantially homogeneous within a cohesive region (code bars), and above all at the boundaries of this region should change with as great a gradient as possible. For the conventional ABS systems that detect the wheel rotations it is, in contrast, sufficient if the magnetization in the peripheral direction of the tire be effected in a sinusoidal manner.

In principle, it would be simpler to magnetize the semi-finished product that is installed in the tire sidewall prior to build-up of the tire, and to install such magnetized pieces. With this method, there resulted at the respective abutment or contact areas irregularities in the magnetization and air pockets in the green tire. In addition, problems resulted due to the bulging process of the tire. At least one class of compounds having very high residual magnetism (neodymium iron borides) degrades starting at temperatures greater than about 120° C., i.e. the magnetization of particles of this material decreases irreversibly so that the tire vulcanization, which is frequently carried out at temperatures of between 160° C. to 200° C., stands in the way of the use of these materials.

For this reason, in the event that neodymium iron borides are to be used, the magnetization of the tire sidewall must be effected after the vulcanization.

Although other hard ferrites can be exposed to this temperature without degradation of the magnetic properties, a disorientation or disalignment of the particles in the rubber mixture can occur due to the flow processes, so that the macroscopic magnetization of a zone(region) decreases, although the magnetization of the particles is not affected. For this reason, even when using these other hard ferrites that are known to the expert the magnetization is preferably carried out after the vulcanization.

In contrast to the wheel bearing seals, pursuant to the present invention the magnetizable regions are disposed in the interior of the tire rubber, so that the minimum distance between the coil wires and the region that is to be magnetized is considerably greater. The field intensity generated by a coil is inversely proportional to the distance from the wire and is therefore reduced in the same proportion as the increase in the distance. The preferred length in the peripheral direction of a homogeneously magnetized region(pole) on the inventive tire is approximately as great as with the known wheel bearing seals and therefore, when the magnetization is effected at the end of the tire production process, produces a satisfactorily strong signal when it passes a sensor in relationship to the expended current intensity. In contrast thereto, merely multiplying the number of wires would lead to an extremely high consumption of energy accompanied by not having an optimum homogeneity of the magnetization within a pole.

Due to the high field intensity required for the magnetization, a correspondingly high number of ampere turns is required. For this reason, a coil-type arrangement is selected.

With the simplest approach of disposing two field or magnetizing coils on both sides of the tire sidewall, with the axes of the coils parallel to the peripheral direction, there is achieved in the region that is to be magnetized only a weak magnetic field in relation to the field intensity in the coils. To increase the strength it is therefore necessary to not return the current at a distance from the tire, but rather to dispose the wires in the vicinity of the tire so that the field becomes maximum in the tire sidewall.

An alternative approach for achieving as homogeneous a field in the peripheral direction as possible in the regions (poles) that are to be magnetized while at the same time not having to take into account great losses during the magnetization, is provided with an arrangement where the field that is generated by the connecting wires between the coils is compensated by an equal magnitude current that however flows in the opposite direction. This arrangement can also be combined with the aforementioned arrangement, e.g. only for the inner connecting wires.

The subject matter of the present invention will be described in detail subsequently with the aid of the accompanying drawings.

DESCRIPTION OF PREFERRED EMBODIMENTS

Figure 1:
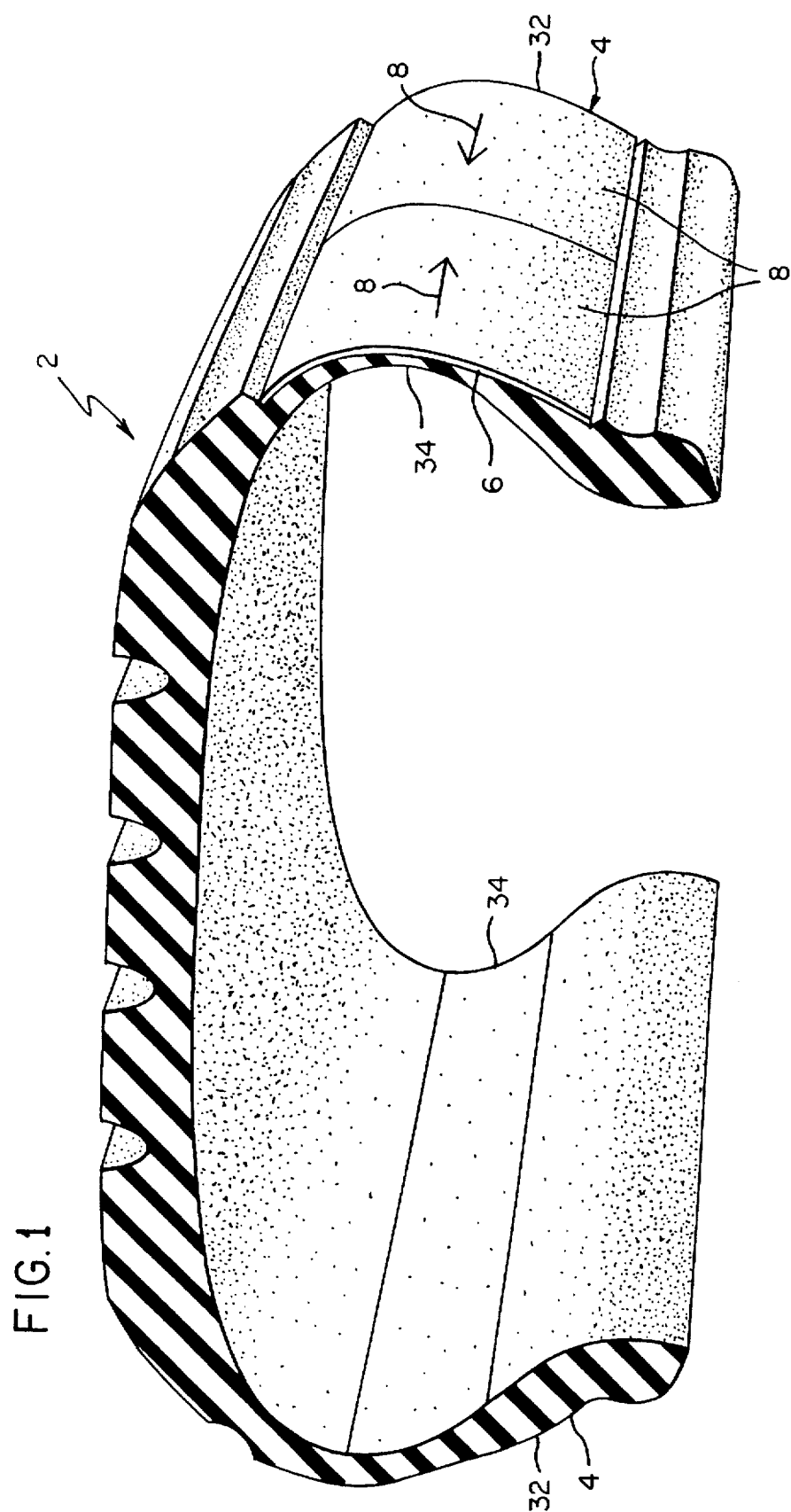
FIG. 1 is a perspective view of a portion of an inventive vehicle tire.

As can be seen from FIG. 1, the inventive vehicle tire 2 is provided on at least one of its sidewalls 4 with an insert or layer 6. This layer 6 is a rubber mixture to which has been added ferromagnetic particles. Such particles are preferably hard ferrites and/or neodymium iron boride that in the magnetized state can have a maximum coercive field intensity of $10^6$ A/m. This layer 6 of magnetizable rubber mixture is magnetized prior to or after vulcanization of the tire 2.

If magnetization is effected prior to vulcanization, care must be taken in the selection of the magnetizable particles so that the required temperature stability (170°) of the magnetization is insured.

The magnetization is preferably carried out subsequent to vulcanization. Magnetization is effected in the direction of the rotation of the sidewall of the tire. In this connection, poles oriented in the longitudinal direction, and poles directed opposite one another, alternate with one another. In this way a kind of magnetic bar code is formed that for scanning purposes can be detected by means of a magnet sensor that is mounted to the side next to the rotating vehicle wheel, being secured either to the chassis or preferably to the wheel axle.

Figure 2:
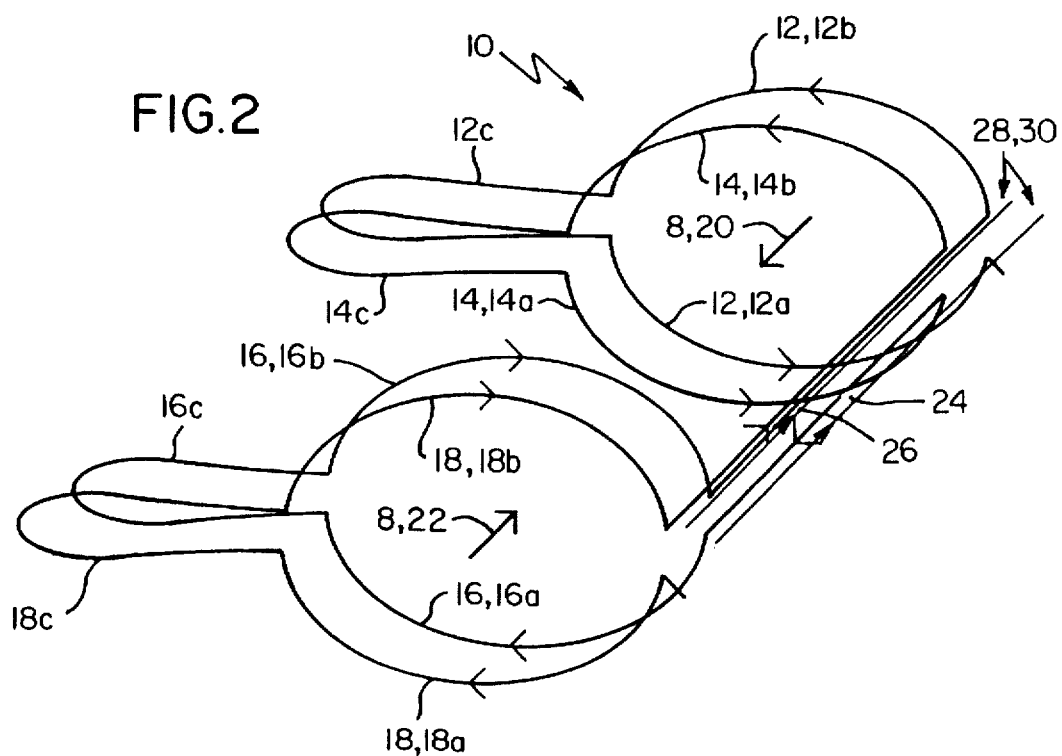
FIG. 2 illustrates the principle of coil arrangement that is the important inventive component of a magnetization apparatus.

The coil arrangement illustrated in FIG. 2 for magnetizing the ferromagnetic rubber mixture 6 found in the tire sidewall 4 comprises four coils 12, 14, 16, and 18, each of which comprises an "inner" coil half 12a, 14a, 16a, and 18a, and an "outer" half 12b, 14b, 16b and 18b. The "inner" coil halves 12a, 14a, 16a and 18a and the "outer" coil halves 12b, 14b, 16b and 18b are respectively interconnected by means of a flexible electrical line 12c, 14c, 16c and 18c. Two respective coils 12 and 14, or 16 and 18, i.e. in each case a coil pair, is electrically connected in the same direction so that each coil pair 12, 14 or 16, 18 generates a rectified magnetic field 20. The two coils 16, 18 of the second coil pair are connected in such a way that they generate a magnetic field 22 that is directed opposite to that of the first coil pair 12, 14.

Electrical connections 24, 26 between the two coil pairs 12, 14 and 16, 18 are respectively provided with a compensation line 28, 30 for the compensation of the magnetic fields of the connecting lines 24, 26. Since the electrical connections 12c, 14c, 16c and 18c between the respective "inner" coil halves 12a, 14a, 16a and 18a and the "outer" coil halves 12b, 14b, 16b and 18b are flexible, the "inner" coil halves 12a, 14a, 16a and 18a can be slipped over the outer side 32 of the sidewall 4, and the "outer" coil halves 12b, 14b, 16b and 18b can be slipped over the inner side 34 of the sidewall 4 of the most different types of tire 2 without difficulty.

Figure 3:
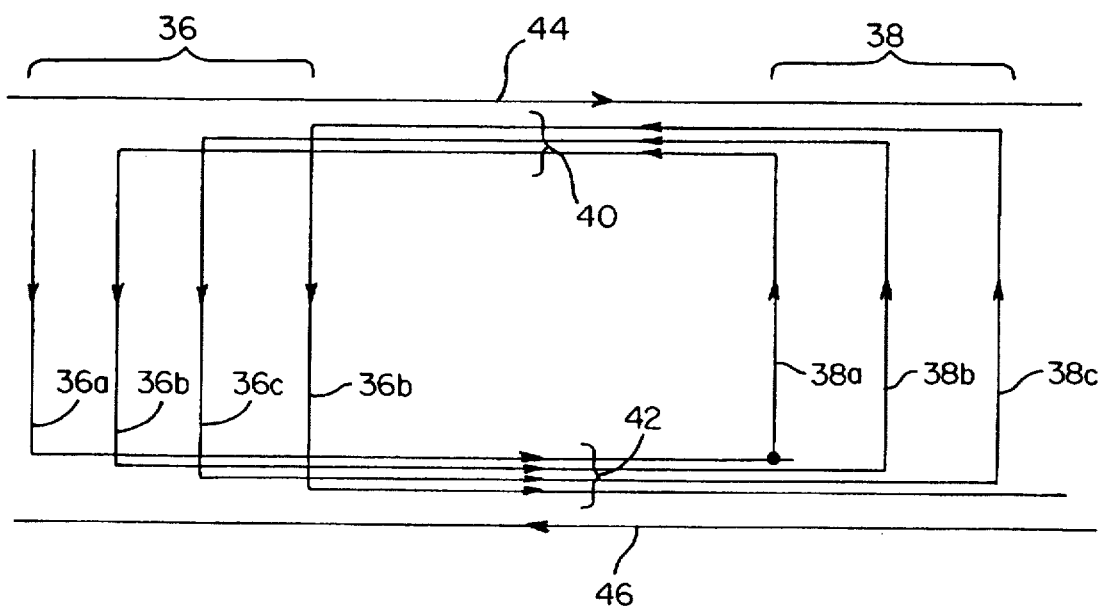
FIG. 3 illustrates the principle of an alternative current guidance.

The embodiment of the electrical conductor arrangement illustrated in FIG. 3 comprises a region 36 of parallel lines 36a, 36b, . . . having the same direction of current, with this region alternating with a region 38 of lines having the opposite direction of current.

The connecting line 40, 42 between the individual lines 36a, 36b, . . . or 38a, 38b, . . . of the line regions and of the overall line arrangement respectively contains a compensation wire 44, 46. This compensation wire 44 or 46 effects a compensation of the magnetic field generated by the connecting line 40 or 42, so that exclusively the wires 36a, 36b . . . and 38a, 38b, . . . , for generation of the main field generate an effective magnetic field. If this alternative wire arrangement is disposed on the sidewall 4 of the tire 2 that is to be magnetized, there results in the magnetizable rubber mixture 6, in the longitudinal direction of the tire sidewall 4, magnet poles 8 having a polarity that is opposed to one another (see FIG. 1).

The present invention is, of course, in no way restricted to the specific disclosure of the specification and drawings, but also encompasses any modifications within the scope of the appended claims.

What we claim is:

1. A pneumatic tire having means for providing information, wherein at least at one predetermined location said tire contains a rubber mixture that is permeated with magnetizable particles, wherein said magnetizable particles are magnetized in a number of first zones, and wherein said magnetizable particles are magnetized in a number of second zones in a different manner than in said first zones.

2. A pneumatic tire according to claim 1, wherein in both said first and second zones the magnetic lines of flux extend in a peripheral direction of said tire with an opposite orientation in said second zones than in said first zones.

3. A pneumatic tire according to claim 1, wherein said rubber mixture is in the form of an annular band obtained by a straight extrusion aligning said magnetizable particles in the direction of extrusion and by forming said extruded straight band into said annular band.

4. A pneumatic tire according to claim 1, wherein said rubber mixture is in the form of an annular hand obtained by a straight calenderation aligning said magnetizable particles in the direction of calenderation and by forming said calendered straight band into said annular band.

5. A pneumatic tire according to claim 1, wherein said first zones and said second zones follow one another in at least one row, each row being disposed at a different radius along a peripheral direction of the tire.

6. A pneumatic tire according to claim 1, wherein said magnetizable particles are hard magnetic.

7. In a method of producing a vulcanized pneumatic tire, the improvement comprising:

adding magnetizable particles to an unvulcanized rubber mixture thereby forming an unvulcanized rubber mixture permeated with magnetizable particles;

forming an unvulcanized pneumatic tire having means for providing information, wherein at least at one predetermined location said tire contains the unvulcanized rubber mixture permeated with magnetizable particles;

vulcanizing said pneumatic tire;

magnetizing said magnetizable particles in a number of first zones and magnetizing said magnetizable particles in a number of second zones in a different manner than in said first zones.

8. A method according to claim 7, further including the step of:

generating an unvulcanized rubber annular band from said unvulcanized rubber mixture permeated with magnetizable particles, whereby said magnetizable particles are anisotropically aligned in a peripheral direction of said tire by way of extrusion or calenderation of said unvulcanized rubber mixture permeated with magnetizable particles.

9. A method according to claim 8, wherein the step of magnetizing said magnetizable particles occurs after formation of said unvulcanized pneumatic tire.

10. A method according to claim 9, wherein said magnetizing step is carried out only after said vulcanizing step.

11. A method according to claim 1, further including the step of:

delivering said vulcanized tire to a customer, wherein said step of magnetizing said magnetizable particles is effected only after said delivering step.

12. The method of use of a pneumatic tire in a slip regulation system, the tire having means for providing information, wherein at least at one predetermined location said tire contains a rubber mixture that is permeated with magnetizable particles, wherein said magnetizable particles are magnetized in a number of first zones and are magnetized in a number of second zones in a different manner than in said first zones, the method of use including the step of detecting time intervals between the passage of said zones in a rotating vehicle wheel including said tire.

* * * * *